US010176606B2

(12) United States Patent
Jammikunta et al.

(10) Patent No.: US 10,176,606 B2
(45) Date of Patent: Jan. 8, 2019

(54) METHOD AND APPARATUS FOR CONVERTING DIAGRAMS INTO APPLICATION ENGINEERING ELEMENTS

(71) Applicant: Honeywell International Inc., Morristown, NJ (US)

(72) Inventors: Ravi Jammikunta, Hyderabad (IN); Santosh Gopisetti, Hyderabad (IN); Jaganmohan Y. Reddy, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 656 days.

(21) Appl. No.: 14/839,237

(22) Filed: Aug. 28, 2015

(65) Prior Publication Data

US 2017/0061031 A1 Mar. 2, 2017

(51) Int. Cl.
*G06F 17/30* (2006.01)
*G06T 11/20* (2006.01)

(52) U.S. Cl.
CPC ...... *G06T 11/206* (2013.01); *G06F 17/30958* (2013.01); *Y02P 90/02* (2015.11)

(58) Field of Classification Search
None
See application file for complete search history.

(56) References Cited

U.S. PATENT DOCUMENTS

| 5,862,751 | A | 1/1999 | Triantopoulos et al. |
| 6,369,836 | B1 * | 4/2002 | Larson ............... G05B 19/0426 715/763 |
| 2004/0236711 | A1 | 11/2004 | Nixon et al. |
| 2007/0008343 | A1 | 1/2007 | Scheidhauer et al. |
| 2009/0282067 | A1 | 11/2009 | Bendigeri et al. |
| 2010/0094437 | A1 | 4/2010 | Schmidt |
| 2017/0293418 | A1 * | 10/2017 | Hams ................ G06F 3/04845 |

FOREIGN PATENT DOCUMENTS

| EP | 2755149 A1 | 7/2014 |
| JP | 2001-249706 A | 9/2001 |
| JP | 2002-342384 A | 11/2002 |

OTHER PUBLICATIONS

The International Searching Authority, "Notification of Transmittal of the International Search Report and the Written Opinion of The International Searching Authority, or the Declaration," in connection with International Patent Application No. PCT/US2016/048196 dated Nov. 22, 2016, 10 pages, publisher International Application Division, Korean Intellectual Property Office, Daejeon, Republic of Korea.

* cited by examiner

*Primary Examiner* — Belix M Ortiz Ditren

(57) ABSTRACT

A method includes obtaining information defining a diagram that contains a diagram element graphically representing a component of an industrial process control and automation system. The method also includes generating a graph representing the diagram element by identifying reference points in the diagram element, identifying at least one direction of each of multiple lines in the diagram element, and forming the graph using the at least one direction of each line and the reference points. The method further includes comparing the graph of the diagram element to one or more graphs of one or more application engineering elements. In addition, the method includes generating a meta file identifying a position of the diagram element in the diagram and the application engineering element that most closely matches the diagram element.

18 Claims, 14 Drawing Sheets

1502 →
```xml
<?xml version="1.0"?>
<PIDDiagram>
    - <Block>
        <BlockName>TC_Block</BlockName>
        <BlockType>PID</BlockType>
        <BlockText>TC-1O1</BlockText>
        <X1>249</X1>
        <Y1>2230</Y1>
        <X2>497</X2>
        <Y2>2499</Y2>
        <ConnectedBlks>TCV_Block</ConnectedBlks>
        <ConnectedBlks>TT_Block2</ConnectedBlks>
    </Block>
    - <Block>
        <BlockName>TCV_Block</BlockName>
        <BlockType>AO</BlockType>
        <BlockText>TCV-1O1</BlockText>
        <X1>251</X1>
        <Y1>1150</Y1>
        <X2>476</X2>
        <Y2>1479</Y2>
        <ConnectedBlks>TC_Block</ConnectedBlks>
        <ConnectedBlks>ContrlValve_Block</ConnectedBlks>
    </Block>
    - <Block>
        <BlockName>ContrlValve_Block</BlockName>
        <BlockType/>
        <BlockText>Control-Valve</BlockText>
        <X1>187</X1>
        <Y1>600</Y1>
        <X2>573</X2>
        <Y2>899</Y2>
        <ConnectedBlks>TCV_Block</ConnectedBlks>
        <ConnectedBlks>StreamHeater_Block</ConnectedBlks>
    </Block>
    - <Block>
        <BlockName>TT_Block2</BlockName>
        <BlockType>AI</BlockType>
        <BlockText>TT-1O1</BlockText>
        <X1>923</X1>
        <Y1>2248</Y1>
        <X2>1200</X2>
        <Y2>2498</Y2>
        <ConnectedBlks>TC_Block</ConnectedBlks>
        <ConnectedBlks>StreamHeater_Block</ConnectedBlks>
    </Block>
    - <Block>
        <BlockName>StreamHeater_Block</BlockName>
        <BlockType/>
```

1504 (brace covering first Block)

FIGURE 15

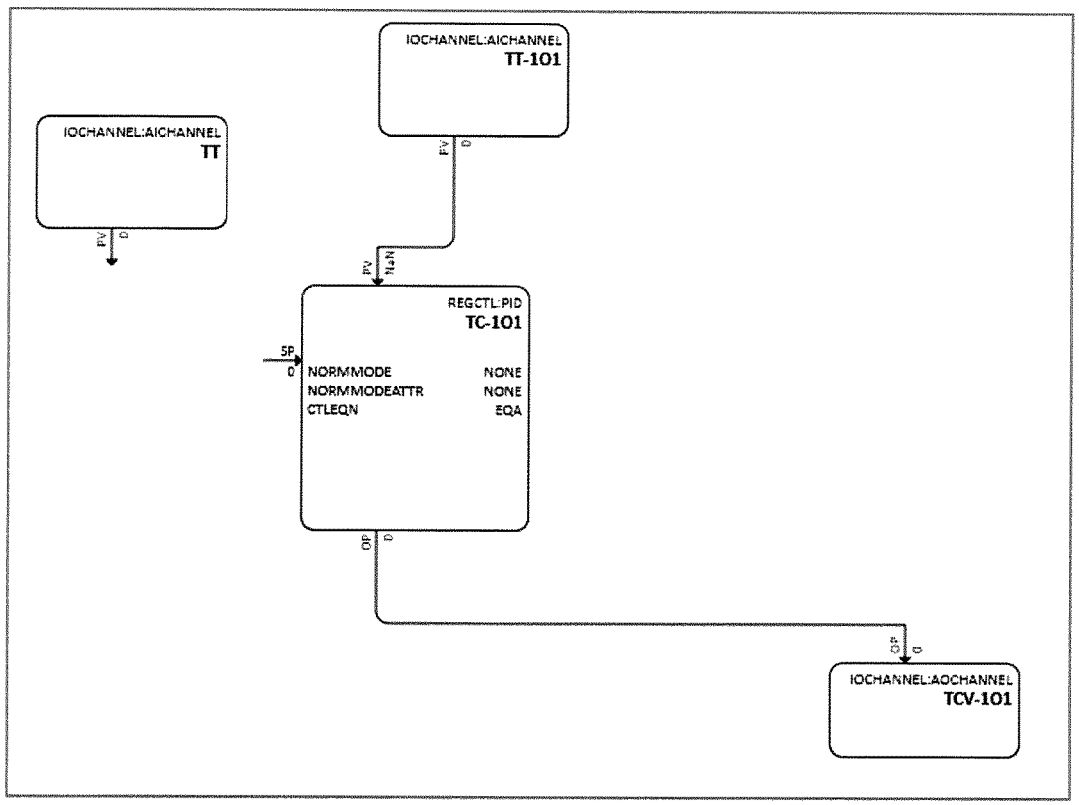
FIGURE 17 ⬉1702

METHOD AND APPARATUS FOR CONVERTING DIAGRAMS INTO APPLICATION ENGINEERING ELEMENTS

TECHNICAL FIELD

This disclosure relates general to industrial process control and automation. More specifically, this disclosure relates to a method and apparatus for converting diagrams into application engineering elements.

BACKGROUND

In industrial process control and automation systems, "application engineering" typically involves designing, testing, and deploying software tools or other applications for use by human operators or automated machinery. For example, application engineering often involves building control strategies and display screens for programmable logic controllers (PLCs) or distributed control systems (DCSs). In many conventional control and automation systems, application engineering can often consume a large portion of the resources for any given project.

SUMMARY

This disclosure provides a method and apparatus for converting diagrams into application engineering elements.

In a first embodiment, a method includes obtaining information defining a diagram that contains a diagram element graphically representing a component of an industrial process control and automation system. The method also includes generating a graph representing the diagram element by identifying reference points in the diagram element, identifying at least one direction of each of multiple lines in the diagram element, and forming the graph using the at least one direction of each line and the reference points. The method further includes comparing the graph of the diagram element to one or more graphs of one or more application engineering elements. In addition, the method includes generating a meta file identifying a position of the diagram element in the diagram and the application engineering element that most closely matches the diagram element.

In a second embodiment, an apparatus includes at least one memory configured to store information defining a diagram that contains a diagram element graphically representing a component of an industrial process control and automation system. The apparatus also includes at least one processing device configured to generate a graph representing the diagram element by identifying reference points in the diagram element, identifying at least one direction of each of multiple lines in the diagram element, and forming the graph using the at least one direction of each line and the reference points. The at least one processing device is also configured to compare the graph of the diagram element to one or more graphs of one or more application engineering elements. In addition, the at least one processing device is configured to generate a meta file identifying a position of the diagram element in the diagram and the application engineering element that most closely matches the diagram element.

In a third embodiment, a non-transitory computer readable medium contains computer-readable program code that when executed causes at least one processing device to obtain information defining a diagram that contains a diagram element graphically representing a component of an industrial process control and automation system. The medium also contains computer-readable program code that when executed causes the at least one processing device to generate a graph representing the diagram element by identifying reference points in the diagram element, identifying at least one direction of each of multiple lines in the diagram element, and forming the graph using the at least one direction of each line and the reference points. The medium further contains computer-readable program code that when executed causes the at least one processing device to compare the graph of the diagram element to one or more graphs of one or more application engineering elements. In addition, the medium contains computer-readable program code that when executed causes the at least one processing device to generate a meta file identifying a position of the diagram element in the diagram and the application engineering element that most closely matches the diagram element.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 14 through 17 illustrate an example conversion of a diagram into a meta file imported into different applications according to this disclosure.

DETAILED DESCRIPTION

FIGS. 1 through 17, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
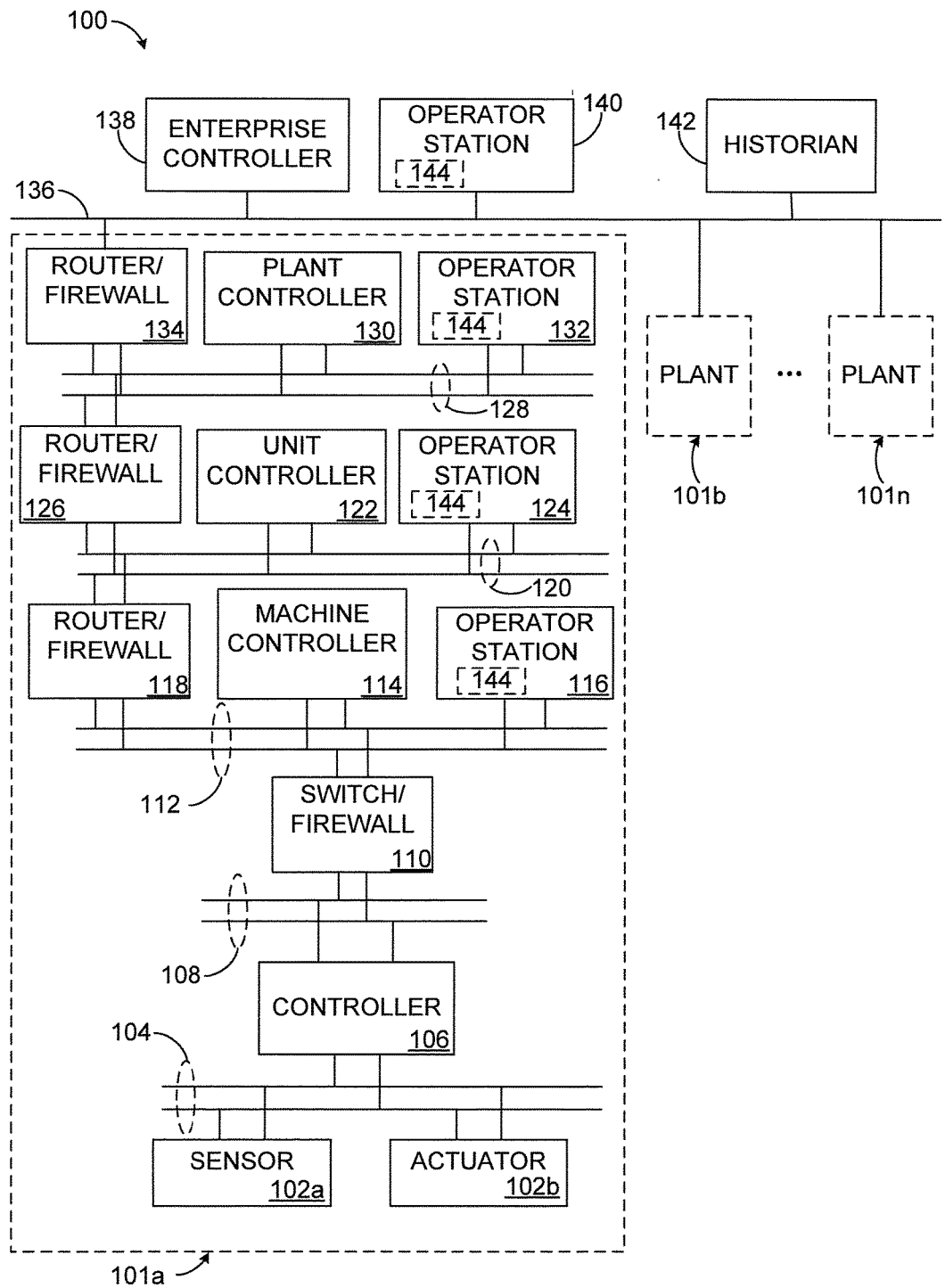
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

Redundant networks 104 are coupled to the sensors 102a and actuators 102b. The networks 104 facilitate interaction with the sensors 102a and actuators 102b. For example, the networks 104 could transport measurement data from the sensors 102a and provide control signals to the actuators 102b. The networks 104 could represent any suitable redundant networks. As particular examples, the networks 104 could represent redundant IEC-61850, IEC-62439, Ethernet/IP (EIP), or MODBUS/TCP networks. The networks 104 can have any suitable configuration, such as a parallel or ring topology.

In the Purdue model, "Level 1" includes one or more controllers 106, which are coupled to the networks 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks. The networks 112 could represent any suitable networks, such as a pair of Ethernet networks.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running any operating system (such as a MICROSOFT WINDOWS, LINUX, or other operating system). Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running any operating system (such as a MICROSOFT WINDOWS, LINUX, or other operating system).

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running any operating system (such as a MICROSOFT WINDOWS, LINUX, or other operating system). Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running any operating system (such as a MICROSOFT WINDOWS, LINUX, or other operating system).

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running any operating system (such as a MICROSOFT WINDOWS, LINUX, or other operating system).

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running any operating system (such as a MICROSOFT WINDOWS, LINUX, or other operating system).

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running any operating system (such as a MICROSOFT WINDOWS, LINUX, or other operating system). In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running any operating system (such as a MICROSOFT WINDOWS, LINUX, or other operating system).

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

As described above, application engineering often involves building control strategies and display screens. The control strategies can be used by various controllers 106, 114, 122, 130, 138 in order to adjust or control one or more industrial processes. The display screens can be used by various operator stations 116, 124, 132, 140 to present information to and receive information from human operators. Also as noted above, application engineering can often consume a large portion of the resources for any given project. Part of the reason for this is that standard or non-standard process and instrumentation diagrams (P&ID) are often used in the control strategies and display screens. These diagrams are pictorial representations of piping, control, instrumentation, safety, or operational information and typically include a large number of application engineering elements. The application engineering elements can be used to provide human operators with coherent views of control strategies and display screens. Application engineering elements and process and instrumentation diagrams are largely standardized by International Society of Automation (ISA) standards. However, application engineering elements and process and instrumentation diagrams can require substantial engineering effort to create.

In accordance with this disclosure, at least one tool 144 is provided for converting diagrams into application engineering elements. The processes used by the tool 144 to convert diagrams into application engineering elements are described below. The tool 144 could be implemented in any suitable manner in the system 100. In this example, different instances of the tool 144 can be executed or otherwise provided by the operator stations, although the tool 144 could be executed or otherwise implemented in other ways. For example, the tool 144 could be executed by a centralized server or provided via a network- or cloud-based service. The tool 144 includes any suitable structure for converting diagrams into application engineering elements. As a particular example, the tool 144 could include one or more software routines executed by a computing device.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which diagrams can be converted into application engineering elements. However, FIG. 1 does not limit this disclosure to any particular configuration or operational environment. Also, the application engineering elements described in this patent document could be used for various purposes, including control strategies or display screens, and may or may not be used with human operators.

Figure 2:
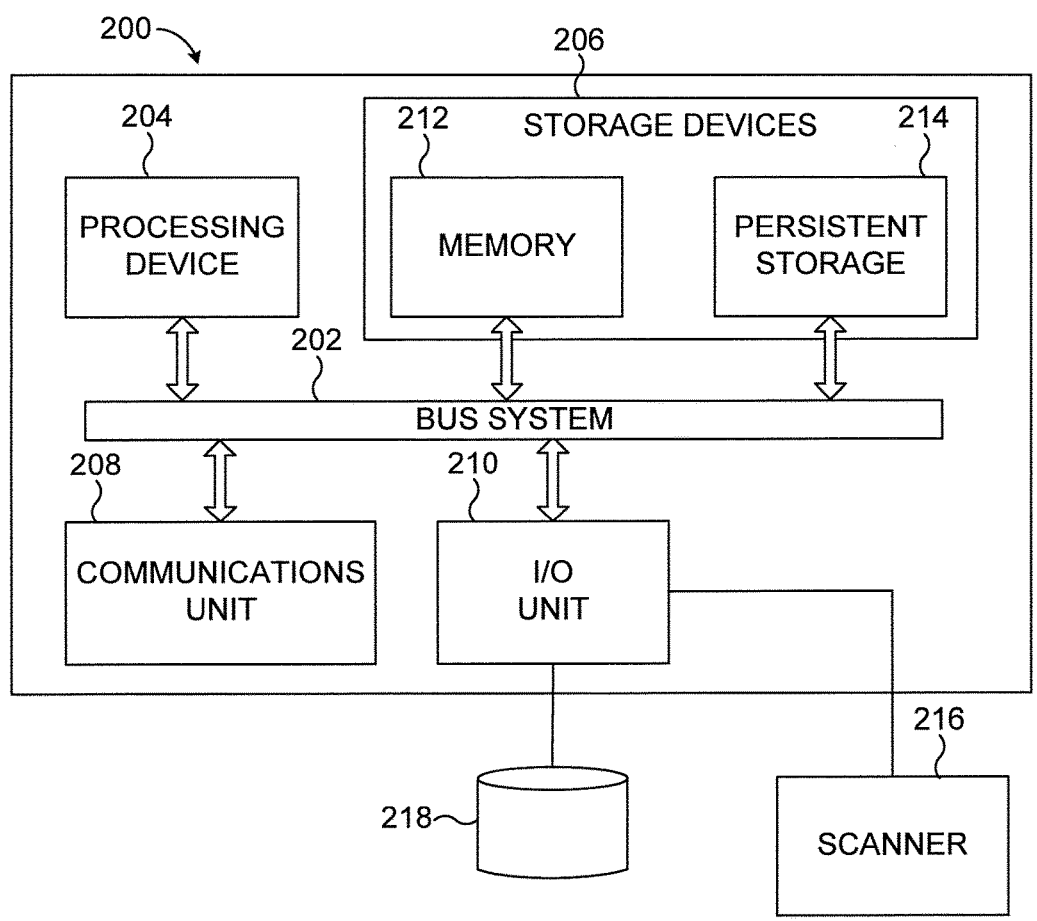
FIG. 2 illustrates an example device for converting diagrams into application engineering elements according to this disclosure.

FIG. 2 illustrates an example device 200 for converting diagrams into application engineering elements according to this disclosure. The device 200 could, for example, represent any suitable computing device in the system 100 of FIG. 1 used to render at least one application engineering element. However, the device 200 could also represent an additional device, such as a desktop, laptop, or server computer or other device that can execute some set of instructions, that is used in conjunction with the system 100.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface card that facilitates communications over at least one Ethernet network. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device. As a particular example, the I/O unit 210 could be used to receive information (such as scanned images) from a scanner 216 and to store information in and receive information from a database 218.

The device 200 shown here can be used to implement the tool 144 described above. The device 200 can therefore use the techniques described below to render application engineering elements from standard or non-standard diagrams. In some embodiments, the device 200 could execute one or more software routines loaded into the memory 212 and executed by the processor 204.

Although FIG. 2 illustrates one example of a device 200 for converting diagrams into application engineering elements, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

Figure 3:
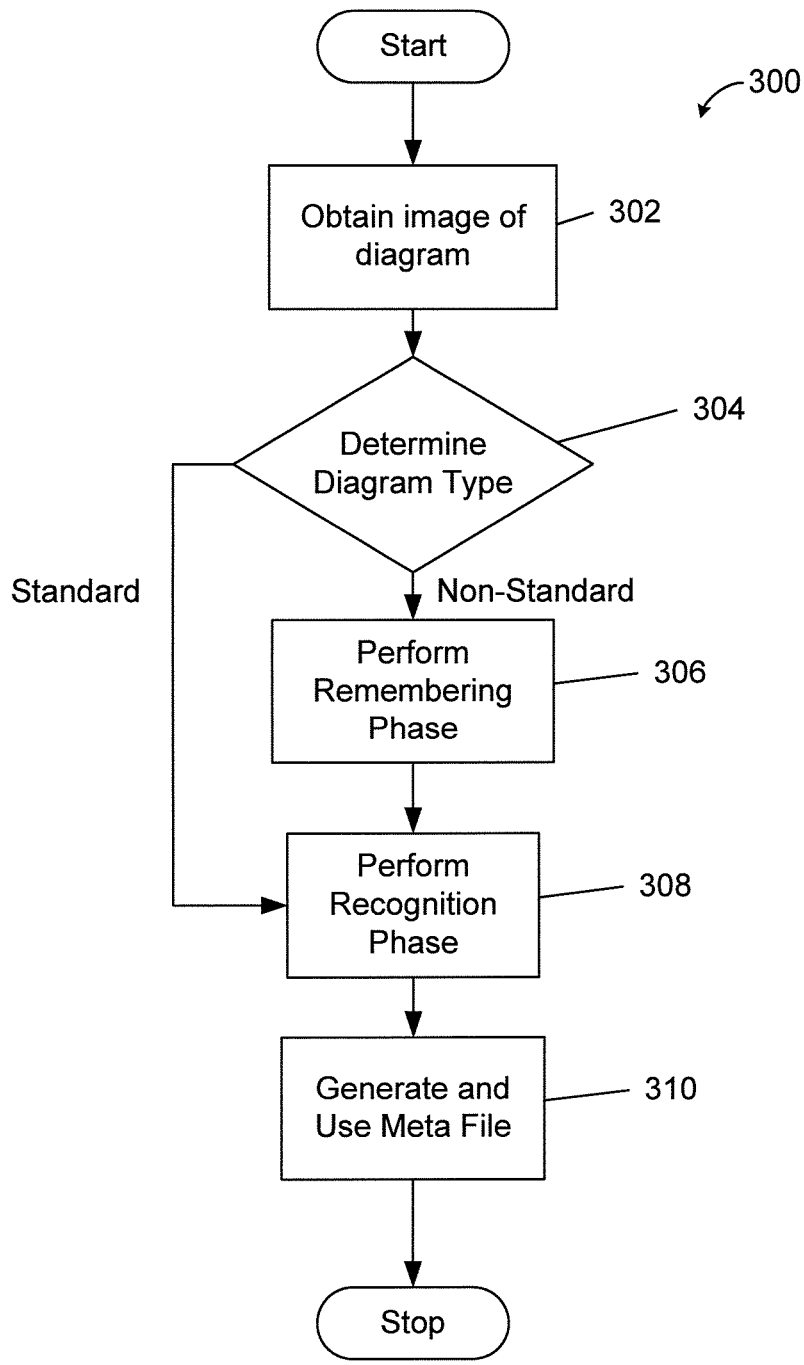
FIG. 3 illustrates an example process for converting diagrams into application engineering elements according to this disclosure.

FIG. 3 illustrates an example process 300 for converting diagrams into application engineering elements according to this disclosure. For ease of explanation, the process 300 is described with respect to the tool 144 implemented using the device 200. However, the process 300 could be used by any other suitable tool, device, or system.

As shown in FIG. 3, an image of a diagram is obtained at step 302. This could include, for example, personnel using the scanner 216 to capture one or more digital images of a physical diagram and identifying the digital image(s) to the tool 144. The tool 144 could then optionally convert the digital image(s) into a format suitable for further processing. This could also include personnel identifying one or more digital files that define the diagram without requiring the use of any physical copy of the diagram. The digital file could include a JPEG, PNG, or other image; a PDF or PPTX document; or other type of file. The tool 144 could then optionally convert the digital file(s) into a format suitable for further processing.

A determination is made whether the diagram represents a standard or non-standard type of diagram at step 304. This could include, for example, the tool 144 determining if the diagram contains only standard elements or if the diagram contains any non-standard elements. In some embodiments, the diagram may contain elements that are defined in an applicable ISA standard and/or elements that are non-standard, and the elements may be defined in a legend on the diagram. This step can therefore include the tool 144 locating the legend (automatically or with user intervention) in the diagram and determining whether the legend identifies any non-standard elements. In other embodiments, the tool 144 could ask a user whether the diagram is in a standard ISA symbol format or a custom format. The user could also be asked to identify the legend area of a custom/non-standard diagram and coordinates of the legend can be identified and stored, or the tool 144 could automatically identify the legend without user intervention.

If the diagram is a non-standard diagram, processing occurs during a "remembering" phase at step 306. During the remembering phase, the tool 144 attempts to learn what elements are used in the diagram and convert those elements into application engineering elements. During this phase, elements in the diagram can be converted into patterns that are more useful for comparison and database storage. For example, the elements in the diagram can be modified by removing fill colors and text and by thinning lines of the elements. Additional details regarding this phase are provided below.

After the remembering phase for a non-standard diagram or if the diagram is a standard diagram, processing occurs during a "recognition" phase at step 308. During this phase, the tool 144 compares the elements of the diagram against patterns in the database 218 to recognize matches. The patterns in the database 218 define application engineering elements. In some embodiments, the elements in the diagram are isolated and modified to be comparable to the patterns stored in the database 218. Again, the elements of the diagram can be modified by removing fill colors and text and by thinning lines of the elements. Comparisons with the patterns can include comparing line lengths, line directions, text data, connections, or any other characteristics that may assist in matching diagram elements to patterns stored in the database 218. Additional details regarding this phase are provided below.

Once the diagram elements have been recognized as matching patterns, a meta file is generated and used at step 310. The meta file describes the elements contained in the diagram, such as their positions and neighbor engineering elements. The meta file will be formed based on each element with a corresponding application engineering element stored in the database 218. The meta file could be used in any suitable manner, such as by importing the meta file into a visualization software program that renders a visual representation of the diagram. As particular examples, the meta file could be imported into any process control builder application used to build control strategies or into a human machine interface (HMI) application used to build display screens. The meta file could denote any suitable type of file. For instance, the meta file may be formatted in a markup language, such as XML or HTML. The meta file may also be formatted in any way that allows easy import, such as a CSV, JSON, or XLSX file.

In some embodiments, each matched diagram element corresponds to a text string in the meta file. The text string can contain information about the diagram element, such as the type of element, the coordinates of the element, or the text from the element. The meta file could be imported once all of the diagram elements have been recognized and their respective text strings have been inserted into the meta file, or the meta file can be imported as each diagram element is recognized and the text string is inserted into the meta file.

Although FIG. 3 illustrates one example of a process 300 for converting diagrams into application engineering elements, various changes may be made to FIG. 3. For example, while shown as a series of steps, various steps in FIG. 3 could overlap, occur in parallel, occur in a different order, or occur any number of times.

Figure 4A:
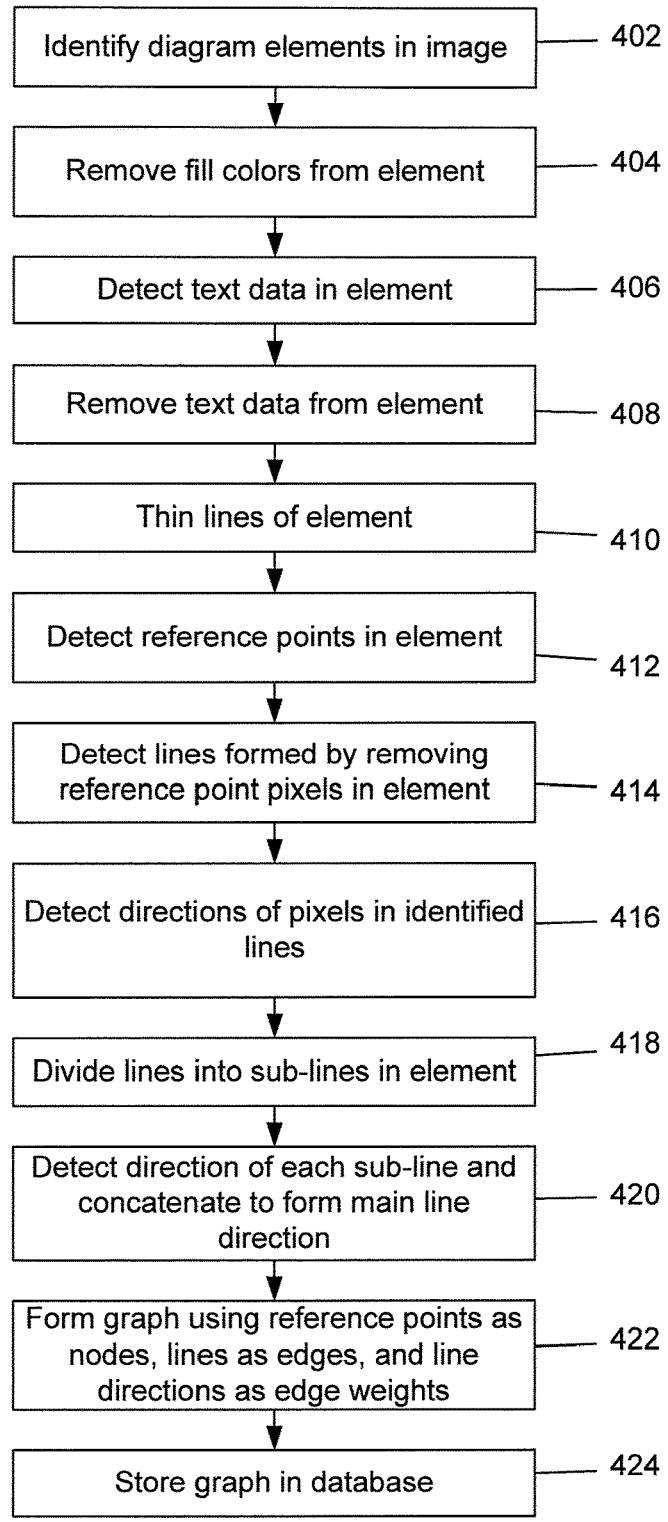
FIGS. 4A through 4C illustrate more detailed portions of the example process of FIG. 3 according to this disclosure.
Figure 4B:
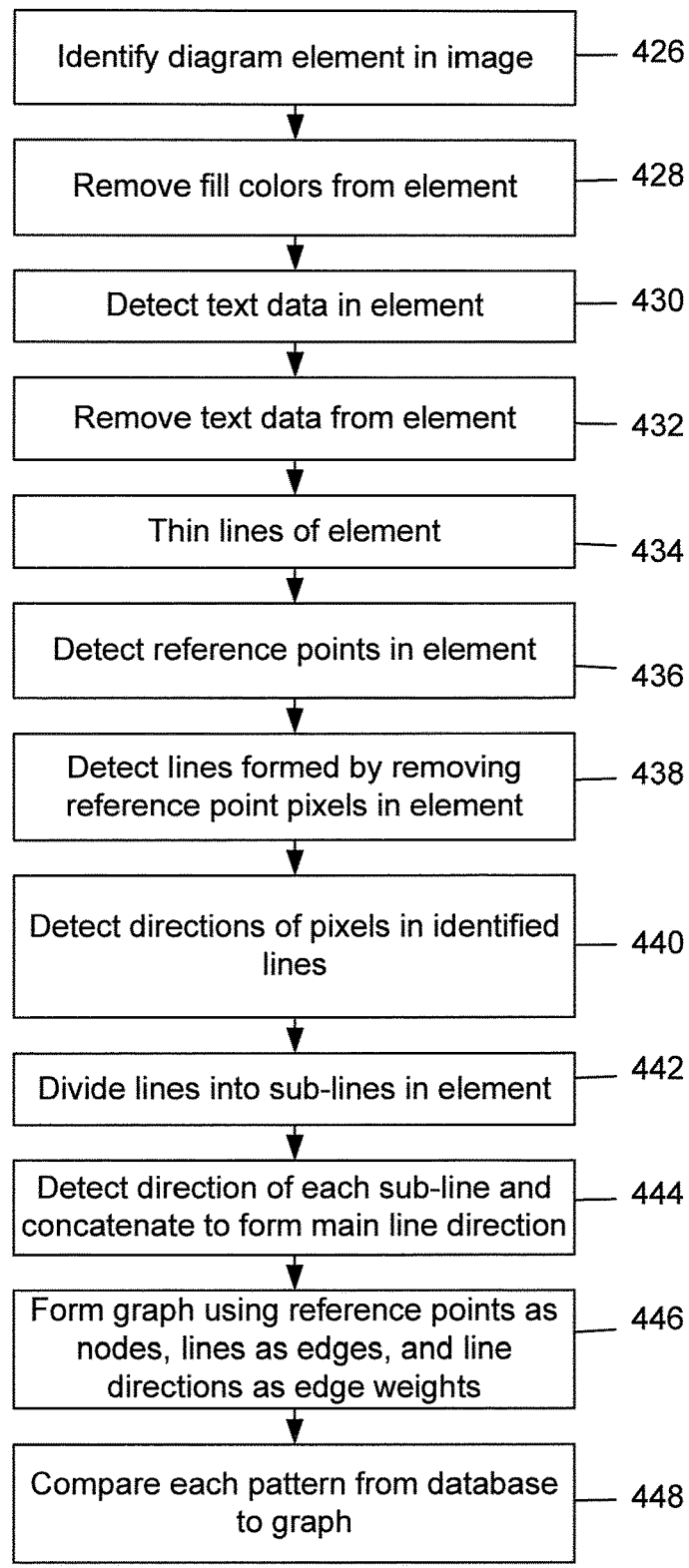
Figure 4C:
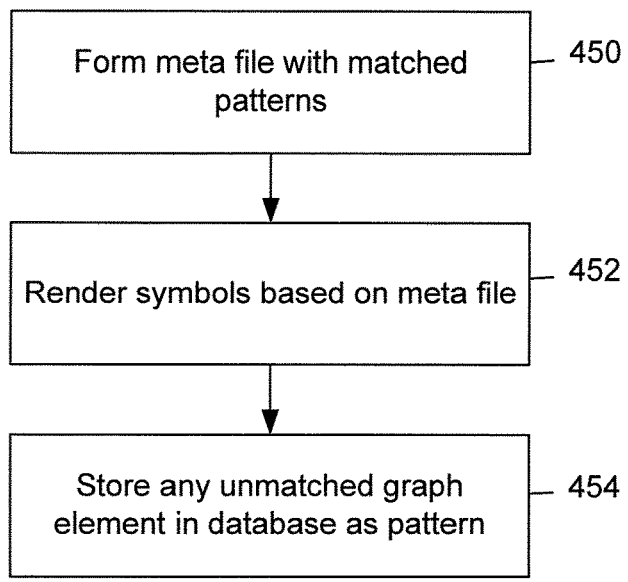

FIGS. 4A through 4C illustrate more detailed portions of the example process 300 of FIG. 3 according to this disclosure. In particular, FIG. 4A illustrates step 306 in more detail, FIG. 4B illustrates step 308 in more detail, and FIG. 4C illustrates step 310 in more detail. Also, FIGS. 5 through 13 illustrate examples of various operations performed during conversion of diagrams into application engineering elements according to this disclosure. FIGS. 5 through 13 are described with respect to the associated operations in FIGS. 4A through 4C.

Figure 5:
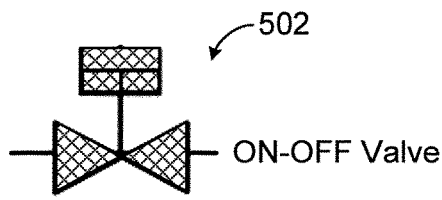
FIGS. 5 through 13 illustrate examples of various operations performed during conversion of diagrams into application engineering elements according to this disclosure.

As shown in FIG. 4A, a diagram is analyzed to identify all elements at step 402. This could include, for example, the tool 144 scanning the diagram to identify all elements defined by the ISA standard or in the legend of the diagram. As noted above, the legend could be identified based on user input or automatically, and the scanning could include identifying the various element symbols in the legend. FIG. 5 illustrates an example element symbol 502 that could be identified during this step.

Figure 6:
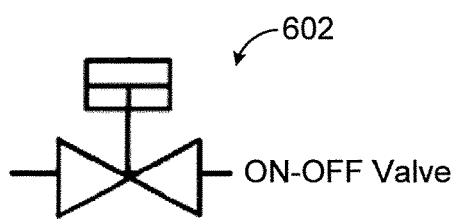

Any fill colors are removed from each element at step 404. This could include, for example, the tool 144 identifying blocks or other sections of a diagram element and removing the fill color in those sections. This can result in the creation of a grayscale or monochrome element symbol. In FIG. 5, the element symbol 502 is shown as having a color represented by cross-hatching. The result of this step could result in the creation of an element symbol 602 as shown in FIG. 6.

Figure 7:
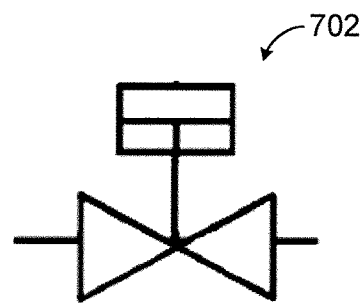

Any text data in each element is detected at step 406 and removed at step 408. This could include, for example, the tool 144 using optical character recognition (OCR) or other text detection technique to detect any text data associated with each diagram element. This could also include the tool 144 using any suitable technique to remove the text data from the diagram element, such as altering pixel data or applying a masking layer. In some embodiments, when text in a diagram element is detected, the text is converted into a text string to be associated with the diagram element in the database 218. FIG. 7 illustrates an example element symbol 702 generated by recognizing and removing the text from the element symbol 602.

Figure 8:
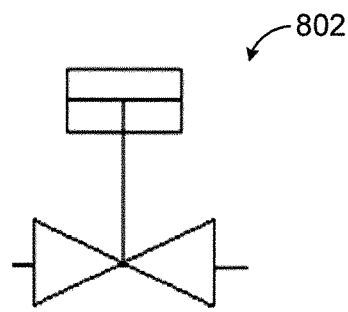

Lines in each element are thinned at step 410. This could include, for example, the tool 144 detecting the lines in each identified element in any suitable manner, such as by using a pixel comparison method or other edge detection method or any image processing optimized method. In some embodiments, each line is thinned to a one-pixel width. FIG. 8 illustrates an example element symbol 802 generated by thinning the lines in the element symbol 602.

Figure 9:
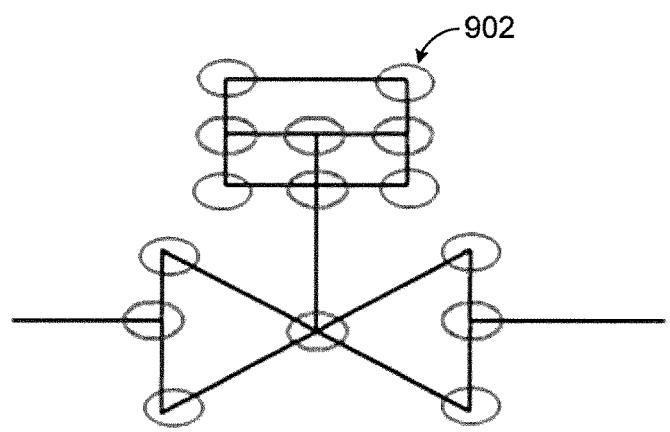

Certain reference points in each element are detected at step 412. This could include, for example, the tool 144 detecting where two or more of the identified lines appear to intersect. In some embodiments, intersections are detected if they include a certain number of adjacent pixels, such as three or more pixels, offset from a line. This could also include the tool 144 detecting where the lines form a corner, which could be defined where the lines intersect at drastic angle. Any suitable threshold could be used to define a drastic angle, such as at least 45°. In some embodiments, pixel comparison methods or heuristic methods can be used to detect areas of interest. FIG. 9 illustrates the element symbol 802 with markers 902 indicating the identified intersections and angles of interest. These are called reference points. A pixel or some set of pixels of the element diagram can be identified as a reference point. As described below, these reference points are used to split the element diagram into a set of non-intersecting and non-cornered lines.

Figure 10:
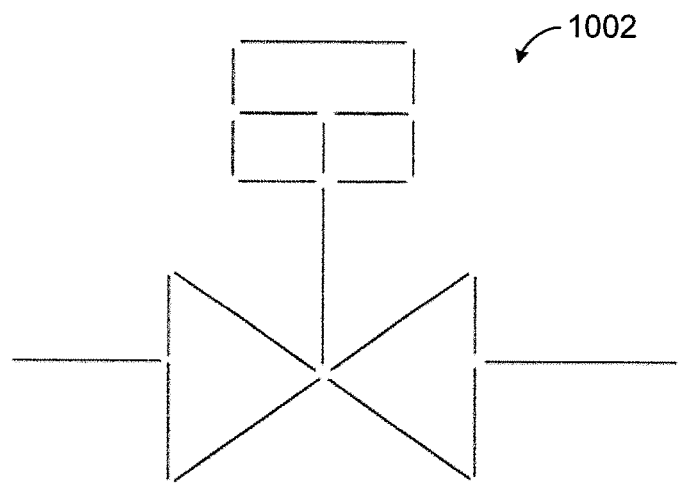

Lines formed by removing the pixels at the reference points in each element are detected at step 414. This could include, for example, the tool 144 removing the pixels at the intersections and corners from each identified element. Once the intersections and concerns angles have been removed, each line can be detected using any suitable line detection method, such as by detecting contiguous runs of pixels. FIG. 10 illustrates an example element symbol 1002 formed by removing pixels within the markers 902. Note, however, that line detection could also be achieved without removing the intersections and corners.

Figure 11:
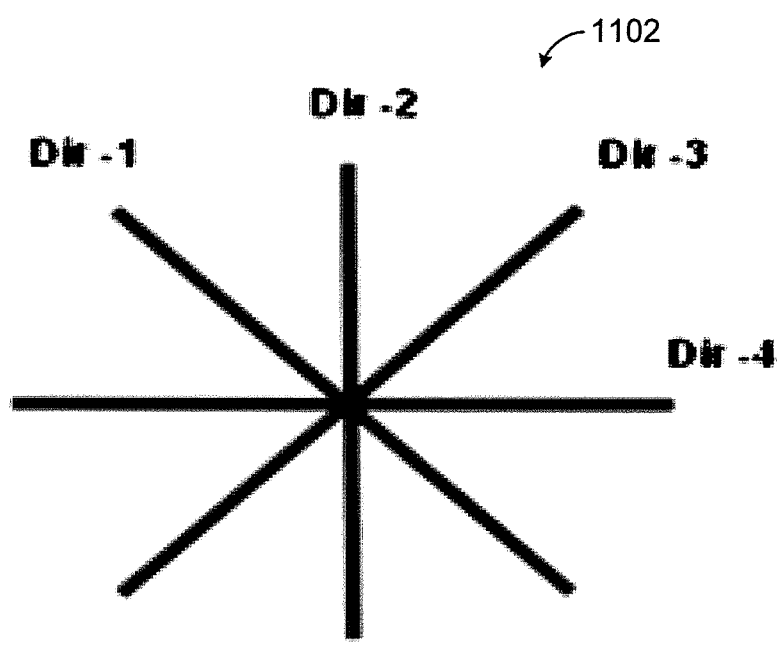

Directions of pixels in the identified lines of each element are detected at step 416. This could include, for example, the tool 144 identifying the directions of the identified lines at the identified intersections and angles. The identified directions can be inserted into the database 218. In some embodiments, each direction may be represented as a numerical value that corresponds to a pre-defined template. FIG. 11 shows an example template 1102 with four directions. Each pixel direction in the line can be determined based on the neighbor pixel alignment and with the help of the template. Note, however, that any other suitable template could be used, and templates can be modified for method optimization and accuracy.

Figure 12:
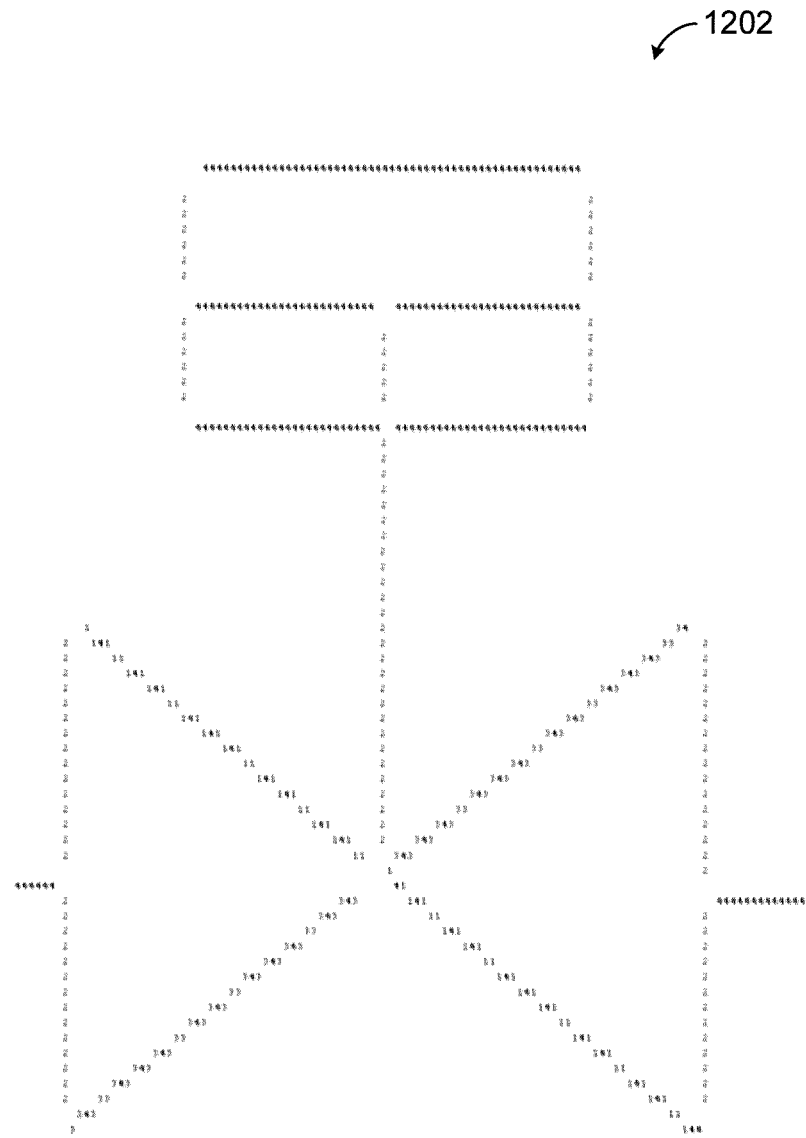

The lines in each element are divided into multiple sub-lines at step 418, and the directions of the sub-lines are identified and concatenated to form a main line direction for each line at step 420. This could include, for example, the tool 144 breaking each line of a diagram element into n sub-lines, where n is fixed or based on any suitable criteria (such as length or accuracy). The direction of each sub-line can be detected in any suitable manner, such as by using the same template as used in step 416. The direction of each sub-line can be determined by the majority number of pixel directions in that sub-line. FIG. 12 illustrates an example data structure 1202 in which the element symbol 1002 has been broken into non-intersecting and non-cornered lines, and directions of the pixels have been identified. The complete line direction for a line is the concatenation of the line's sub-line directions, and the length of a line direction is based on the number of sub-lines in that line. Note, however, that this line direction mechanism can be modified for more accuracy and optimization.

Figure 13:
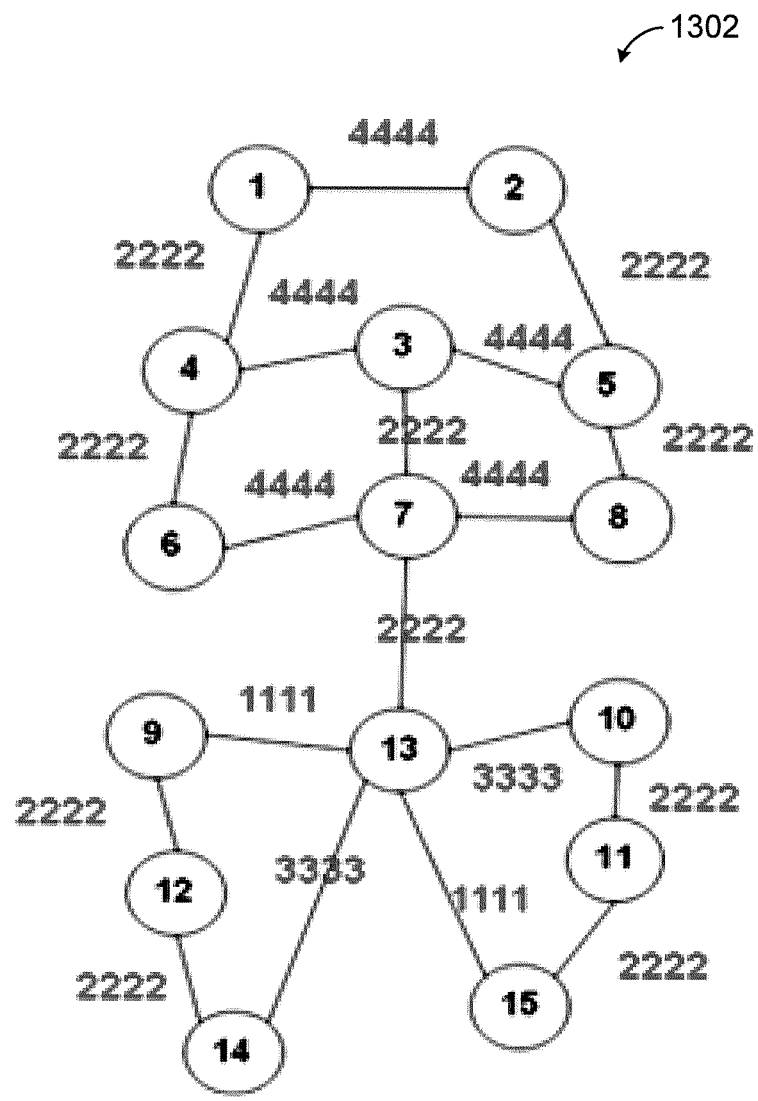

A graph is formed using this information at step 422. This could include, for example, the tool 144 creating a graph of nodes, connectors or edges, and connectivity information. The nodes represent the reference points identified in step 412, the connectors or edges represent the lines identified in step 414, and the connectivity information uses the line directions identified in step 420 as the edge weights. The graph may contain information such as an ordering of the nodes, direction of the connectors, and other information useful in matching the diagram element to a pattern. FIG. 13 illustrates an example graph 1302 based on the data structure 1202. The reference points are identified with numbered circles, and the connectors are identified with numbers identifying the primary directions of the sub-lines of the lines forming the connectors.

The graph is stored in a database at step 424. This could include, for example, the tool 144 storing the graph information in the database 218 along with the extracted text. This information defines one of the application engineering elements in the database that can be used during the recognition phase.

As shown in FIG. 4B, the recognition phase includes many of the same operations (steps 426-446) as the remembering phase. This is because the remembering phase is designed to create graphs representing diagram elements for storage in the database 218, while the recognition phase is designed to create graphs representing diagram elements for comparison to the graphs in the database 218. Note that both the remembering phase and the recognition phase may be performed when a non-standard diagram is being processed, but only the recognition phase may be performed when a standard diagram is being processed. For non-standard diagrams, to the extent that the same element is processed in the remembering phase and the recognition phase, some operations in the recognition phase could occur using the results obtained during the remembering phase. Note that in the recognizing phase, a complete diagram can be analyzed to form a single graph, or each individual element can be analyzed for multiple graphs. The specific implementation can vary based on a number of factors, such as desired method performance optimization and desired method accuracy.

A comparison is made between the graph of each diagram element and the graphs stored in the database at step 448. This could include, for example, the tool 144 comparing the graph created in step 446 with one or more of the graphs created during step 422. The tool 144 could perform the comparison looking for an exact match or an approximate match. A search algorithm could be used that compares the graph created in step 446 with multiple graphs created during step 422 and that generates a score for each comparison. The graph created during step 422 with the highest score exceeding a threshold could then be viewed as the closest match.

As shown in FIG. 4C, for each pattern (graph) of a diagram element that is matched to one of the patterns in the database during the recognition phase, the pattern is stored in a meta file at step 450. This could include, for example, the tool 144 generating a matching table in the meta file. In some embodiments, the pattern itself is stored in the matching table. In other embodiments, a representation of the pattern (such as a code, hash, or index) is stored in the matching table. Information about the pattern can also be stored, such as the location of the pattern in the diagram and an orientation of the pattern in the diagram.

The meta file can be used in any suitable manner. For example, symbols can be rendered based on the meta file at step 452. This could include, for example, the tool 144 or another application reading the meta file and creating application engineering elements based on the contents of the meta file. The symbols can be rendered in any suitable manner, such as blocks of text or graphical representations.

Any unmatched graphs can be stored in the database as new patterns at step 454. For example, when attempting to recognize one of the diagram elements, the tool 144 may determine that no graph in the database 218 has a score exceeding the threshold. In that case, it may be assumed that the diagram element is unique, and its graph can be stored in the database 218 for future use.

Although FIGS. 4A through 4C illustrate more detailed portions of one example of the process 300 of FIG. 3, various changes may be made to FIGS. 4A through 4C. For example, while shown as a series of steps, various steps in each figure could overlap, occur in parallel, or occur any number of times. Although FIGS. 5 through 13 illustrate examples of various operations performed during conversion of diagrams into application engineering elements, various changes may be made to FIGS. 5 through 13. For instance, the contents of FIGS. 5 through 13 are merely meant to illustrate one example of how the steps in FIGS. 4A through 4C could operate.

Figure 14:
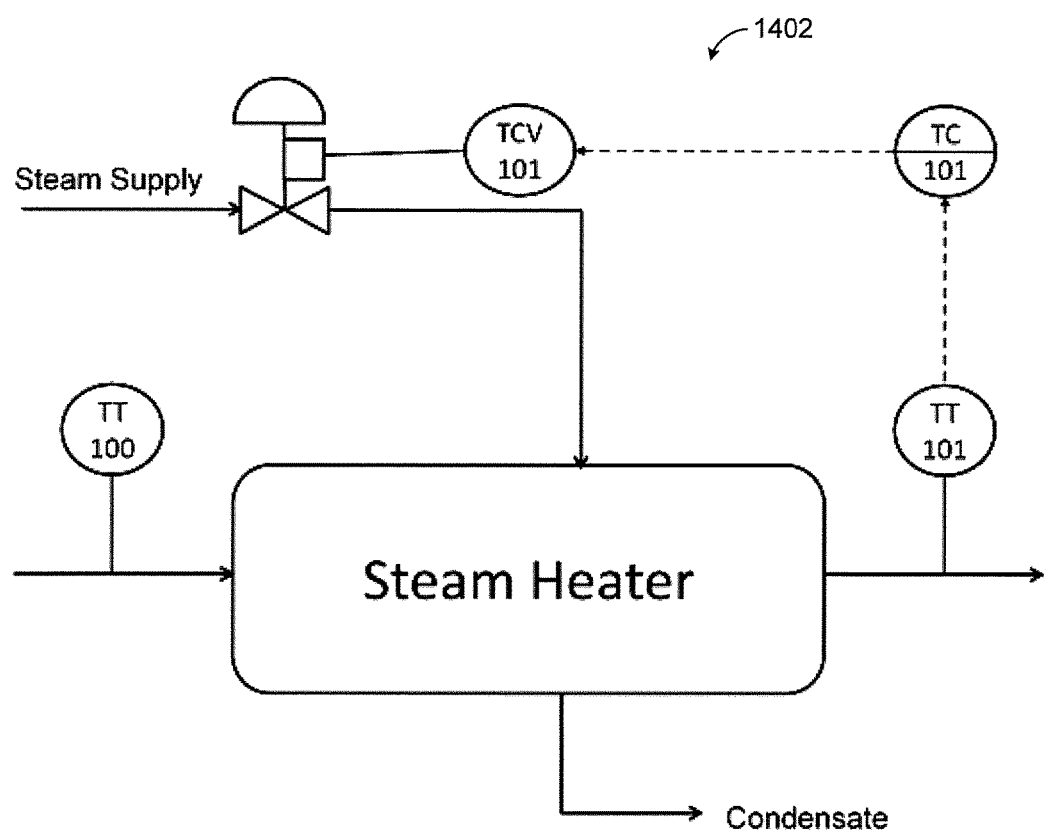

FIGS. 14 through 17 illustrate an example conversion of a diagram into a meta file imported into different applications according to this disclosure. As shown in FIG. 14, a diagram 1402 to be converted represents a portion of an industrial process. The industrial process here includes a steam heater, a valve, and multiple controllers.

FIG. 15 illustrates a portion of an example meta file 1502 created after execution of the process 300 using the diagram 1402. The meta file 1502 includes multiple sections 1504 related to different "blocks" (elements) identified in the diagram 1402. For each element, the meta file 1502 identifies a name of the block assigned by the tool 144 and the type of the block as identified through pattern matching. For each element, the meta file 1502 also identifies any text extracted for that element and a position of that element in the diagram. In addition, for each element, the meta file 1502 identifies the other elements to which this element is connected. Note, however, that the metafile can include much more information and is not limited to the information shown in the example.

Figure 16:
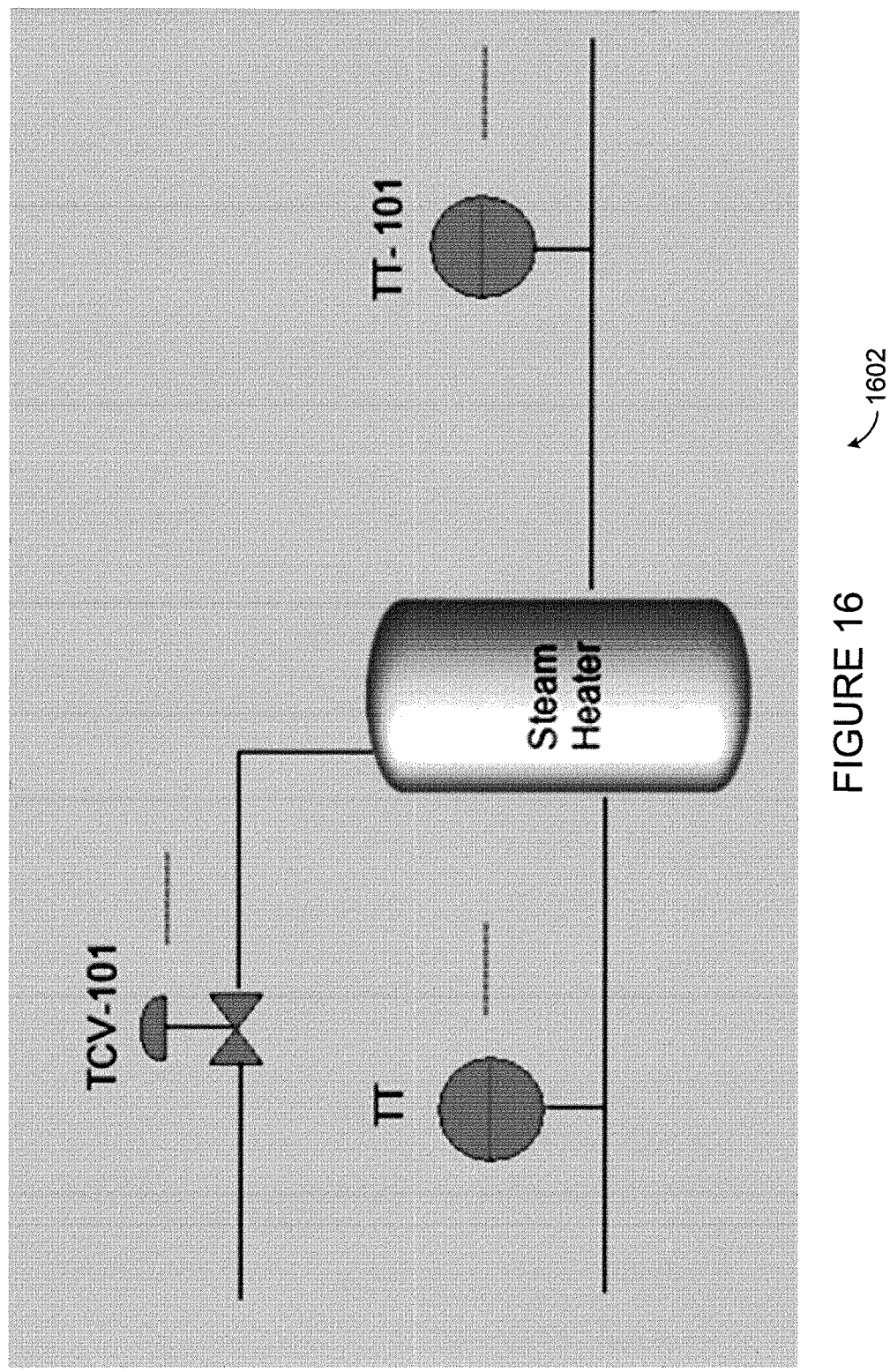

FIG. 16 illustrates an example graphical user interface 1602 for a display screen created using the meta file 1502. FIG. 17 illustrates an example graphical user interface 1702 for a control strategy builder created using the meta file 1502. As shown here, the meta file 1502 can be rendered in different ways depending on the application using the meta file 1502. However, there is no longer a requirement that personnel create the rendering in the graphical user interface 1602 and create a separate rendering the graphical user interface 1702. Instead, the meta file 1502 allows each application to render a representation of the diagram 1402 automatically with little or no user input. This can greatly simplify the amount of application engineering required for a particular project.

Although FIGS. 14 through 17 illustrate one example of a conversion of a diagram into a meta file imported into different applications, various changes may be made to FIGS. 14 through 17. For example, the contents of FIGS. 14 through 17 are merely meant to illustrate one example of how a diagram could be analyzed and imported into different applications.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for converting a diagram into an application engineering element to be displayed on a display screen in an industrial control and automation system, comprising:
   obtaining at least one image of the diagram using a scanner, wherein the diagram contains a diagram element graphically representing a component of the industrial process control and automation system;
   identifying at least one digital file that defines the diagram;
   converting the at least one digital file into a format suitable for processing;
   generating a graph representing the diagram element by:
      identifying reference points in the diagram element;
      identifying at least one direction of each of multiple lines in the diagram element, wherein identifying the at least one direction of each line comprises:
         sub-dividing at least some of the lines into multiple parts; and
         identifying a direction of each part of the lines with reference to a template defining multiple directions; and
      forming the graph using the at least one direction of each line and the reference points,
   comparing the graph of the diagram element to one or more graphs of one or more application engineering elements;
   generating a meta file identifying a position of the diagram element in the diagram and the application engineering element that most closely matches the diagram element; and
   displaying, on the display screen, a visual representation of the diagram by importing the generated meta files.

2. The method of claim 1, wherein identifying the reference points comprises identifying at least one of:
   one or more locations where the lines appear to intersect; and
   one or more locations where the lines appear to form a corner.

3. The method of claim 1, wherein generating the graph further comprises:
   removing a fill color from the diagram element; and
   thinning the lines in the diagram element.

4. The method of claim 1, wherein the graph comprises:
   nodes representing the reference points;
   edges representing the multiple lines; and
   edge weights representing the at least one direction of each line.

5. The method of claim 1, wherein:
   generating the graph further comprises detecting and removing text from the diagram element; and
   the meta file includes the text for the diagram element.

6. The method of claim 1, wherein:
   the diagram contains multiple diagram elements;
   the method further comprises generating the graph for each diagram element and comparing the graph of each diagram element to the one or more graphs of the one or more application engineering elements; and the meta file identifies the position of each diagram element in the diagram and the application engineering element that most closely matches each diagram element.

7. The method of claim 1, further comprising:
determining that the diagram contains a non-standard diagram element;
generating an additional graph for the non-standard diagram element; and
storing the additional graph in a database.

8. The method of claim 7, further comprising:
scanning a legend of the diagram to identify the non-standard diagram element.

9. The method of claim 1, further comprising:
rendering an image containing the application engineering element that most closely matches the diagram element using the meta file.

10. An apparatus for converting a diagram into an application engineering element to be displayed on a display screen in an industrial control and automation system, comprising:
at least one memory configured to store at least one image of the diagram from a scanner, wherein the diagram contains a diagram element graphically representing a component of the industrial process control and automation system; and
at least one processing device configured to:
identify at least one digital file that defines the diagram;
convert the at least one digital file into a format suitable for processing;
generate a graph representing the diagram element by:
identifying reference points in the diagram element;
identifying at least one direction of each of multiple lines in the diagram element, wherein identifying the at least one direction of each line comprises:
sub-dividing at least some of the lines into multiple parts; and
identifying a direction of each part of the lines with reference to a template defining multiple directions; and
forming the graph using the at least one direction of each line and the reference points;
compare the graph of the diagram element to one or more graphs of one or more application engineering elements;
generate a meta file identifying a position of the diagram element in the diagram and the application engineering element that most closely matches the diagram element; and
displaying, on the display screen, a visual representation of the diagram by importing the generated meta files.

11. The apparatus of claim 10, wherein the at least one processor is configured to identify the reference points by identifying at least one of:
one or more locations where the lines appear to intersect; and
one or more locations where the lines appear to form a corner.

12. The apparatus of claim 10, wherein the at least one processor is configured to generate the graph further by:
removing a fill color from the diagram element;
detecting and removing text from the diagram element; and
thinning the lines in the diagram element;

wherein the meta file includes the text for the diagram element.

13. The apparatus of claim 10, wherein:
the diagram contains multiple diagram elements;
the at least one processor is configured to generate the graph for each diagram element and compare the graph of each diagram element to the one or more graphs of the one or more application engineering elements; and
the meta file identifies the position of each diagram element in the diagram and the application engineering element that most closely matches each diagram element.

14. The apparatus of claim 10, wherein the at least one processor is further configured to:
determine that the diagram contains a non-standard diagram element;
generate an additional graph for the non-standard diagram element; and
store the additional graph in a database.

15. The apparatus of claim 10, wherein the at least one processor is further configured to render an image containing the application engineering element that most closely matches the diagram element using the meta file.

16. A non-transitory computer readable medium containing computer-readable program code, for converting a diagram into an application engineering element to be displayed on a display screen in an industrial control and automation system, that when executed causes at least one processing device to:
obtain at least one image of the diagram using a scanner, wherein the diagram contains a diagram element graphically representing a component of the industrial process control and automation system;
identifying at least one digital file that defines the diagram;
converting the at least one digital file into a format suitable for processing;
generate a graph representing the diagram element by:
identifying reference points in the diagram element;
identifying at least one direction of each of multiple lines in the diagram element, wherein identifying the at least one direction of each line comprises:
sub-dividing at least some of the lines into multiple parts; and
identifying a direction of each part of the lines with reference to a template defining multiple directions; and
forming the graph using the at least one direction of each line and the reference points;
compare the graph of the diagram element to one or more graphs of one or more application engineering elements; and
generate a meta file identifying a position of the diagram element in the diagram and the application engineering element that most closely matches the diagram element; and
displaying, on the display screen, a visual representation of the diagram by importing the generated meta files.

17. The non-transitory computer readable medium of claim 16, further containing computer-readable program code that when executed causes the at least one processing device to:
determine that the diagram contains a non-standard diagram element;
generate an additional graph for the non-standard diagram element; and
store the additional graph in a database.

18. The non-transitory computer readable medium of claim 16, further containing computer-readable program code that when executed causes the at least one processing device to:
   render an image containing the application engineering element that most closely matches the diagram element using the meta file.

* * * * *